June 14, 1960    A. D. WOOD    2,940,690
AIRCRAFT WITH SPLIT FLAPS AND GAS JET BOUNDARY LAYER CONTROL
Filed Jan. 22, 1958    3 Sheets-Sheet 1

Inventor
Arthur D. Wood
by Stevens Davis Miller & Mosher
his attorneys

June 14, 1960 A. D. WOOD 2,940,690
AIRCRAFT WITH SPLIT FLAPS AND GAS JET BOUNDARY LAYER CONTROL
Filed Jan. 22, 1958 3 Sheets-Sheet 2

Inventor
Arthur D. Wood
by Stevens Davis Miller+Mosher
his attorneys

June 14, 1960  A. D. WOOD  2,940,690
AIRCRAFT WITH SPLIT FLAPS AND GAS JET BOUNDARY LAYER CONTROL
Filed Jan. 22, 1958  3 Sheets-Sheet 3
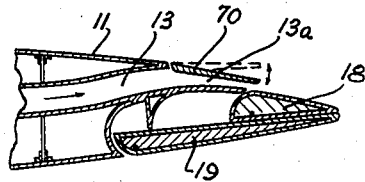
Fig. 8.
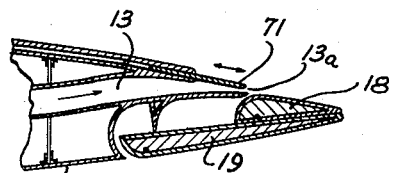
Fig. 9.
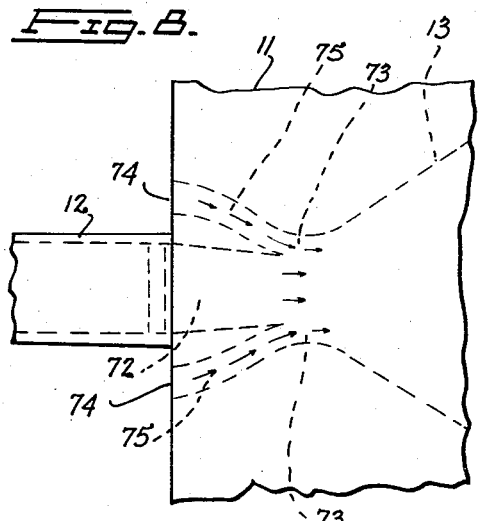
Fig. 10.
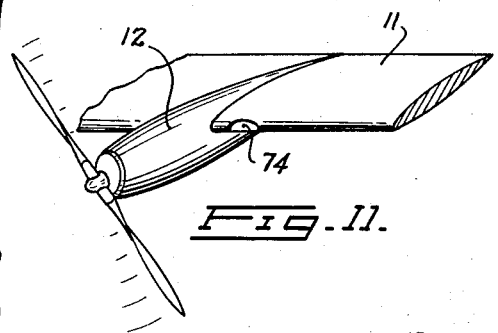
Fig. 11.
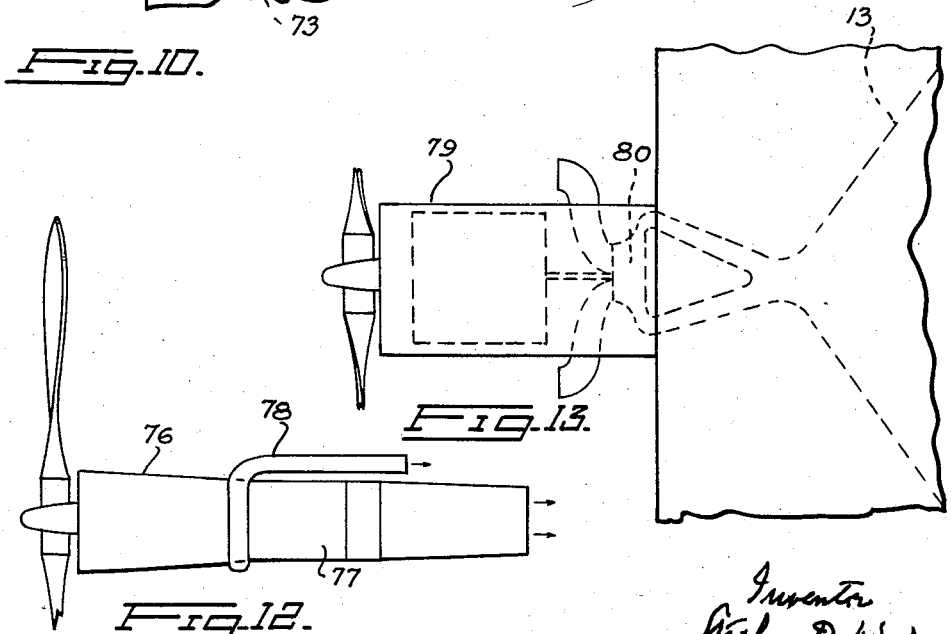
Fig. 12.
Fig. 13.
Inventor
Kirkham D. Wood
by Stevens Davis...
his attorney United States Patent Office 2,940,690
Patented June 14, 1960

2,940,690
AIRCRAFT WITH SPLIT FLAPS AND GAS JET BOUNDARY LAYER CONTROL

Arthur D. Wood, Ottawa, Ontario, Canada, assignor to National Research Council, Ottawa, Ontario, Canada, a corporation of Canada Filed Jan. 22, 1958, Ser. No. 710,531

4 Claims. (Cl. 244—12)

This invention relates to aircraft and is directed towards the attainment of a wing structure capable of deflecting a surrounding fluid stream downwards through a very large angle thus creating a high vertical force or lift.

It is anticipated that the invention will find application particularly in aircraft designed to take off and land with a minimum of forward velocity, commonly known as VTOL (vertical take-off and landing) and STOL (short take-off and landing) aircraft. Such aircraft will generally be required to operate efficiently also in cruising flight.

To obtain a high lifting force at zero or low forward velocities it is necessary to direct the propulsive air or gas stream in a downward direction. Where the propulsive stream is provided by propellers this must be done either by turning the rotational axis of the propellers to produce thrust directly in this direction or by providing means of turning the propulsive stream into the downward direction to the rear of the propellers. Since a vertical force is required to sustain flight at zero forward velocity, the angle through which the propulsive stream from the propellers (or slipstream) should be turned is approximately 90 degrees in cases of greatest practical interest.

Rotation of the propeller axes to provide a vertical rather than a horizontal force for take-off and landing necessitates unwieldy and heavy rotation gear. Methods put forward hitherto for turning the slipstream through a large angle have involved the use of extremely large flap surfaces and/or guide vanes which are also unwieldy, heavy and inefficient.

The object of the present invention is to provide an aircraft with an improved wing structure which does not suffer from these disadvantages, but which is at the same time capable of deflecting a propeller slipstream or the exhaust gas stream from a jet propulsion engine through a large angle when required for take-off and landing, and thus of generating high lift even in the absence of forward aircraft velocity.

This object is achieved by providing an aircraft having a pair of wings and at least one propulsive unit mounted forwardly of each wing in position to generate a gas stream to flow rearwardly over both the upper and under-surfaces of said wing, each said wing comprising a slot disposed in the vicinity of its upper trailing edge rearwardly of said propulsive unit, a main flap movable into a position to extend downwardly into the path of that part of said gas stream flowing along the under surface of said wing to deflect such flow downwardly, and an auxiliary flap disposed to occupy a position in which it extends at least partially downwardly at the trailing edge of said wing from a position rearwardly of said slot, said flaps defining a cavity between them, and means for projecting a second gas stream outwardly and rearwardly from said slot of sufficient energy to follow the contour of said auxiliary flap by virtue of the Coanda effect whereby to induce a trapped vortex in said cavity and to undergo further downward deflection and thus to impart a similar downward deflection of that part of the first gas stream flowing along the upper surface of said wing.

The "propulsive unit" may be a propeller, in which case the "gas stream" that it generates will be its slipstream. Alternatively, the "propulsive unit" may be a jet propulsion engine, in which case the said "gas stream" will be the whole or a part of the propulsion gases of such engine.

It is believed that the invention will be better understood by reference to the specific examples described below in connection with the accompanying drawings, in which:

Figure 8 is a fragmentary view of the rear of the wing shown in Figure 2 illustrating a modification;

Figure 9 is a further view similar to Figure 8 showing a further modification;

Figure 10 is a diagrammatic plan view of a wing portion illustrating a still further modification;

Figure 11 is a front perspective view of the modification seen in Figure 10;

Figure 12 is a further diagram of an engine illustrating yet another modification; and Fig. 13 is a diagrammatic plan view of a wing portion showing a final modification.

Figure 1:
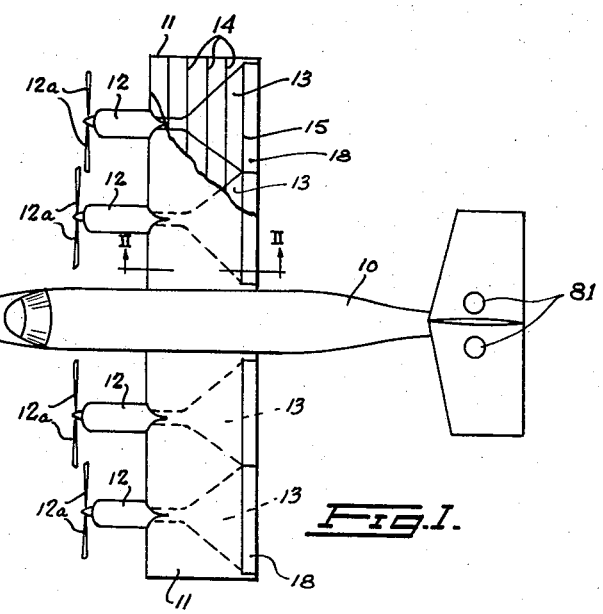
Figure 1 shows a diagrammatic plan view of an aircraft embodying the invention.

Figure 1 shows an aircraft 10 provided with wings 11 and power units 12 of the gas turbine-propeller type having propellers 12a constituting the propulsive units. A distinction is drawn between the power units (the engines themselves) and the propulsive units (the propellers), since, although it is essential for the propulsive units to be mounted forwardly of the wings, the power units could be remote from the propulsive units that they drive in any convenient part of the aircraft.

Figure 2:
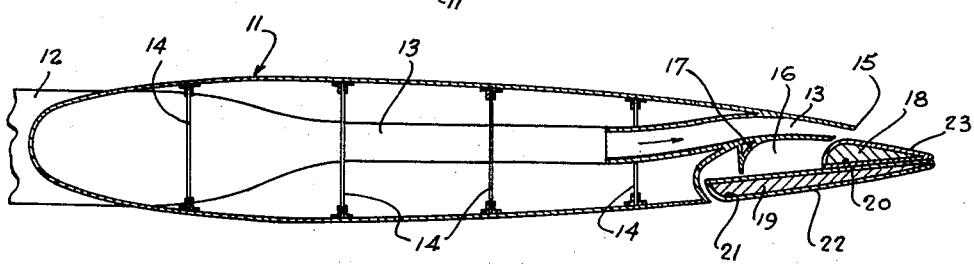
Figure 2 is a section of one wing of this aircraft on an enlarged scale taken on the line II—II in Figure 1.

Each power unit 12 discharges its exhaust gases through a conduit 13 that converges in the direction away from the unit 12 when viewed in the vertical plane of Figure 2, while diverging in the horizontal direction as seen in the plan view of Figure 1. The wings 11 have conventional spars 14, the ducts 13 passing through apertures in these spars.

At the trailing edge of each wing 11, its upper surface terminates along a straight edge 15, this edge defining the upper rear edge of the slot 13a through which the duct 13 discharges. At its underside, the trailing edge of each wing 11 is formed with a cavity 16 defined by a longitudinally extending curved member 17 and by upper and lower flaps 18 and 19. The upper or auxiliary flap 18, which serves to control the position and direction of the jet issuing from slot 13a, is pivotally mounted in a conventional manner at the inboard and outboard ends of the wing about an axis 20. The main flap 19 is similarly mounted about an axis 21. In the normal flight position of these flaps shown in Figure 2, they both lie substantially horizontally one on top of the other, with the undersurface 22 of the main flap 19 defining the rear undersurface of the wing as a smooth continuation of the main underside thereof. The upper surface 23 of the auxiliary flap 18 defines a continuation of the lower surface of the duct 13. With the parts in these positions and, with or without gas being blown from the slot 13a, the streamline flow around the wing will be substantially conventional for that of an aircraft in normal flight.

Figure 3:
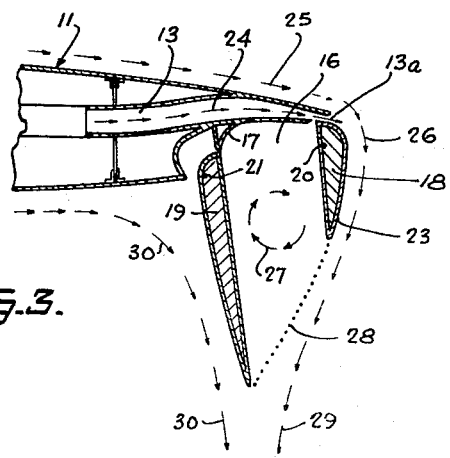
Figure 3 is a fragment of the rear of the wing seen in Figure 2, showing the movable parts thereof in the "take-off" position.

When it is required to use this wing structure to convert the propeller thrust to a vertical lift force at zero forward velocity, or to enhance the normal aerodynamic lift by the same means in forward flight at low speeds, the flaps 18 and 19 are rotated about their respective axes to the substantially vertical positions shown in Figure 3. In this position, the gas stream indicated by the arrow 24 ejected from each blowing slot 13a will be deflected around the flap 18 to follow the surface 23 thereof, by virtue of the well-known Coanda effect (see, for example, United States Patent No. 2,052,869 issued September 1, 1936, to H. Coanda). At the same time this "second" gas stream will act on the propeller slipstream "the first gas stream" (arrow 25) passing along the top of the wing 11 to deflect this also downwardly. The combined flow is indicated by the arrow 26, and, up to this point, is similar to that which would be obtained by employing a device such as the shrouded jet-flap described in "The Jet Flap" by I. M. Davidson, Journal of the Royal Aeronautical Society, January 1956.

After passing the lower tip of the flap 18, the combined gas stream will produce a trapped vortex 27 in the cavity 16, with a stagnation streamline 28 separating the vortex flow 27 from the external flow. This stagnation streamline will serve in a manner similar to a continuance of the flap 18, but being infinitely flexible and therefore able to adapt itself to a favourable shape under all circumstances and furthermore by contributing nothing to the growth of a boundary layer within the combined flow 29, it will act with much greater efficiency in further deflecting downwards the combined flow.

At the same time that part of the propeller slipstream flowing along the underside of the wing 11 will be deflected as indicated by the arrows 30 in a substantially vertical downward path. The result is deflection of the entire propeller slipstream through substantially 90 degrees and the creation of a vertical lifting force. By correctly proportioning the constituent parts of this wing and flap assembly in relation to the propeller diameter, by appropriately dividing the total power expended between the propeller and the exhaust gas stream and by selecting optimum values of gas exhaust velocity and mass flow, the reaction obtained per unit of input power will be greater than that afforded by existing methods for deflecting a slipstream through large angles. Furthermore a deflection angle of 90 degrees giving a vertical lifting force may be readily obtained. Finally the moving components of the structure need be no larger than conventional flaps so that the necessity for heavy attachments and rotation mechanisms is avoided.

Actual experiments conducted on a small scale in wind-tunnel apparatus of a suitable type have confirmed that the result described above is obtained, and there appear to be three essential ingredients for this manner of operation: Firstly, a cavity in the trailing edge of the wing in which a vortex can be induced; secondly, a second stream of gas to act, in combination with an auxiliary control flap, to deflect the flow of the propeller airstream, or other "first" gas stream from the upper surface of the aerofoil downwardly past the trailing edge of the auxiliary flap, to induce a vortex in the cavity and thereby to result in further deflection of both the gas streams; and thirdly, the main flap providing the lower boundary of the cavity and for deflecting the lower part of the airstream from beneath the aerofoil into a downward direction.

The vortex formed at the trailing edge of the wing, between the auxiliary and main flaps, is generated in all cases by the action of the ejected or "second" gas stream. The vortex in turn, as a result of its rotation and low pressure, assists in further bending this gas stream without contributing to boundary layer growth within the stream. Furthermore, this gas stream provides a direct contribution to the vertical lifting force on the wing by virtue of its momentum, which will be augmented by mixing with the external flow (the first gas stream) under the favourable condition of low pressure existing during its passage along the stagnation streamline enclosing the vortex.

The vertical width of the slot 13a may be made adjustable, if desired, to provide the most favourable conditions for obtaining a maximum forward thrust in cruising flight. This can be accomplished by means of a further pivoted flap 70 (as shown in Fig. 8) or by means of a further sliding flap 71 (as shown in Fig. 9).

Figure 4:
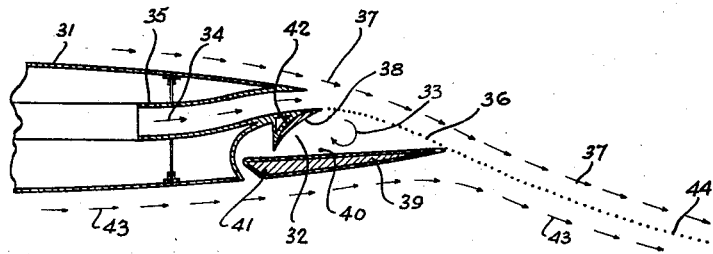
Figure 4 is a fragment of the rear of a wing showing an alternative construction within the invention, with the parts in their "normal flight" position.
Figure 5:
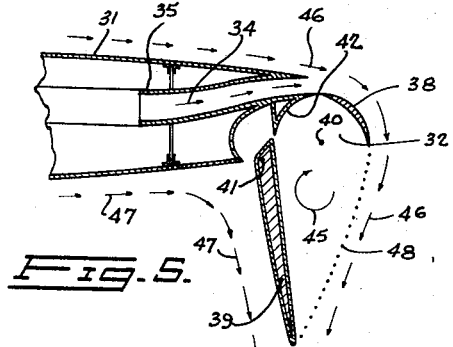
Figure 5 shows the construction of Figure 4 with the parts in the "take-off" position.

In the structure just described the cavity 16 formed in the trailing edge of the aerofoil is inactive during normal flight conditions, but this is not of any special significance. Figures 4 and 5 show an alternative construction, seen in normal flight and take-off positions respectively, and here it will be observed that a vortex is formed under both sets of conditions. The trailing edge of the wing 31 shown in Figures 4 and 5 is formed with a cavity 32 in which a vortex 33 is formed by the action of a jet stream 34 projected rearwardly from an exhaust duct 35 similar to the ducts 13. Under these conditions a stagnation streamline 36 is formed which is substantially aerodynamically equivalent to a solid surface so that streamline flow of the airstream 37 travelling along the upper surface of the aerofoil occurs in the normal manner.

This construction has an auxiliary flap 38 and a main flap 39, these flaps being respectively rotatable about axes 40 and 41, the axis 40 of the auxiliary flap 38 being displaced from the flap itself so that it effectively slides between the withdrawn position shown in Figure 4 and the extended position shown in Figure 5, such sliding taking place along the undersurface of member 42 which together with the flaps 38 and 39 defines the cavity 32. The airstream 43 travelling along the underside of the wing 31 also flows normally, a stagnation streamline 44 typical of normal flight extending rearwardly and downwardly from the trailing edge of the flap 39.

In the take-off position, both flaps are moved to the position shown in Figure 5, a vortex 45 being formed within the cavity 32 and being separated by stagnation streamline 48 from the main airstream 46 travelling along the top of the wing, around the auxiliary flap 38, as a result of the jet stream 34, and vertically downwardly beyond the rear of the wing. At the same time the main flap 39 deflects the airstream 47 on the underside of the wing into a vertical downward direction.

This construction differs from that of Figures 1 and 2 in that to form the cavity for the take-off position the auxiliary flap 38 is extended rearwardly and downwardly instead of almost directly downwardly. It should be noted that, in this type of arrangement, it is not imperative that the auxiliary flap be moved into a fully retracted position, such as shown in Figure 4, for normal cruising flight. The position of this auxiliary flap may be controlled, in fact, by the pilot to ensure that a trapped vortex is formed in the cavity 32 so that flow separation at the rear of the aerofoil and hence the profile drag are minimized in cruising flight.

Figure 6:
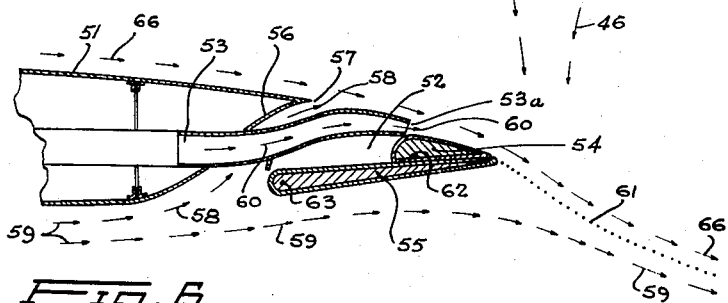
Figure 6 is a similar view of a fragment of a still further modified form of wing for use with the invention, the movable parts being in the "normal flight" position.

The present invention can also be applied to a slotted wing design, as shown in Figure 6 which illustrates a wing 51 at the trailing edge of which there is formed a cavity 52 defined between the underside of an exhaust gas duct 53 and a pair of flaps 54 and 55 generally similar to the flaps 18 and 19 of Figure 3. Additionally, however, as well as the jet stream 60 flowing in the exhaust duct 53, there is a passage 56 of the type typically employed in slotted-wing construction, the passage 56 extending upwardly from the undersurface of the wing to an outlet slot 57 situated just forwardly of the blowing slot 53a of the duct 53. A portion 58 of the propeller slipstream 59 flowing along the undersurface of the wing 51 travels along the passage 56 to add its effect to the gas jet 60 issuing from the duct 53. In normal flight, with the parts in the position shown in Figure 6, conditions are typical with stagnation streamline 61 extending rearwardly and downwardly from the trailing edge of the wing. When the flaps 54 and 55 are rotated about their respective axes 62 and 63 into the positions shown in Figure 7, they provide a structure generally similar to that shown in Figure 3, so that, as before, a vortex 64 is formed in the cavity 52, with a stagnation streamline 65 separating this cavity from the downwardly travelling airstream (arrow 66) deflected from the upper surface of the wing 51. Main flap 55 will deflect the slipstream 59 downwardly.

Figure 7:
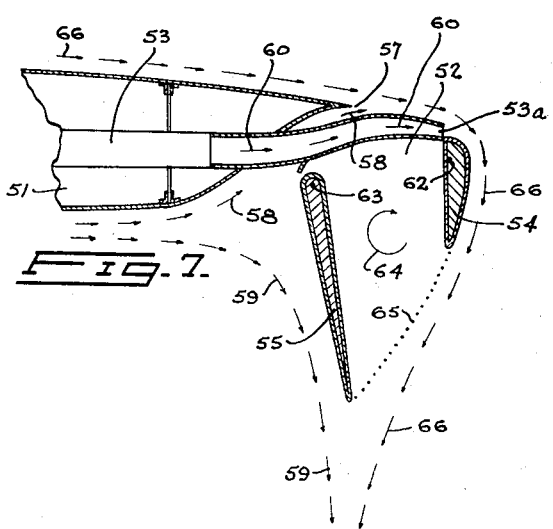
Figure 7 is a view of the modification of Figure 6, with the parts in the "take-off" position.

In this construction the jet stream 60 may be emitted either above the airstream 58, or below it as shown in Figures 6 and 7. In the arrangement illustrated the jet stream 60 crosses the airstream 58 by means of a number of branches of the exhaust duct 53. Viewed from above, the airstream 58 flows from the under surface to the upper surface of the wing by passing between these branches of the exhaust duct 53.

The additional airstream obtained from the slot 57 could not wholly replace the need for a gas stream from the blowing slot 53a, as a higher velocity of stream than is obtainable from a slotted-wing construction is necessary to deflect the slipstream downwardly over the auxiliary flap and to generate the vortex.

In all variations of the present invention it will be possible to augment the blown gas stream with air prior to its ejection from the jet nozzle. This may be done by surrounding the engine jet pipe 72 (shown in Fig. 10) with injector nozzles 73 which derive air from air inlets 74 along conduits 75 (see also Fig. 11). Such an addition will serve to reduce the temperature in the duct 13 and to provide an increased mass flow through the blowing slot 13a. Reduction of jet temperature and velocity if accompanied by an increase in mass flow achieved in this way will normally be advantageous and will lead to greater efficiency.

The aircraft 10 will be provided with controls suitable for hovering and very low speed flight. While these may be integrated with the propulsive-lifting system described, it is anticipated that independent controls of a reaction type such as small fans or pressure jets would be more convenient. Pressure jets have been used successfully for this purpose on several experimental aircraft capable of hovering flight (see "X14 Flies, Transition Tests to Follow," Aviation Week, July 8, 1957). The location of typical pitch controls is indicated at 81 in Figure 1. Such controls form no part of the present invention.

The foregoing assumes that the gas streams for ejection from the slots at the rear of the wings are generated by the aircraft power units, the jet exhaust gases themselves being employed for this purpose. Alternatively, as shown in Fig. 12, a proportion of the outlet flow from the compressor 76 of an engine 77 could be fed directly to the blowing slots by means of auxiliary duct 78, or, if piston engines 79 are installed (Fig. 13), which engines would not supply sufficient gas stream velocities and energies from their exhaust, an auxiliary compressor 80 could be employed with each engine 79 to generate the necessary airstreams to be blown through slot 13a for take-off.

The invention is not applicable to aircraft fitted with simple jet propulsion engines if these engines are situated rearwardly or beneath the wings, since their propulsive jet streams would not then flow over the wings to provide the primary gas streams. The present invention would however be fully applicable to any aircraft employing jet propulsion power units in which such engines were positioned so that the jet streams or a part of the jet streams from such units were caused to flow over the wings in a manner similar to the propeller slipstreams of the illustrated embodiments.

I claim:

1. An aircraft having a pair of wings and at least one propulsive unit mounted forwardly of each wing in position to generate a gas stream to flow rearwardly over both the upper and under surfaces of said wing, each said wing comprising a slot disposed in the vicinity of its upper trailing edge rearwardly of said propulsive unit, a main flap movable into a position to extend downwardly into the path of that part of said gas stream flowing along the under surface of said wing to deflect such flow downwardly, and an auxiliary flap disposed to occupy a position in which it extends at least partially downwardly at the trailing edge of said wing from a position rearwardly of said slot, said flaps defining a cavity between them, and power-operated means for projecting a second gas stream outwardly and rearwardly from said slot of sufficient energy to follow the contour of said auxiliary flap by virtue of the Coanda effect whereby to induce a trapped vortex in said cavity and to undergo further downward deflection and thus to impart a similar downward deflection of that part of the first gas stream flowing along the upper surface of said wing.

2. An aircraft having a pair of wings and at least one power driven propeller mounted forwardly of each wing in position to generate a slipstream to flow rearwardly over both the upper and under surfaces of said wing, each said wing comprising a slot disposed in the vicinity of its upper trailing edge rearwardly of said propeller, a main flap movable into a position to extend downwardly into the path of that portion of said slipstream flowing along the under surface of said wing to deflect such flow downwardly, and an auxiliary flap disposed to occupy a position in which it extends at least partially downwardly at the trailing edge of said wing from a position rearwardly of said slot, said flaps defining a cavity between them, and power-operated means for projecting a gas stream outwardly and rearwardly from said slot of sufficient energy to follow the contour of the auxiliary flap by virtue of the Coanda effect whereby to induce a trapped vortex in said cavity and to undergo further downward deflection and thus to impart a downward deflection to that portion of said slipstream flowing along the upper surface of the wing.

3. An aircraft having a pair of wings and at least one power unit of the gas turbine-propeller type mounted on each wing, each said power unit including a propeller mounted forwardly of said wing, each said wing comprising a slot disposed in the vicinity of its upper trailing edge rearwardly of said propeller, a main flap movable into a position to extend downwardly into the path of that portion of the slipstream from said propeller flowing along the under surface of said wing to deflect such flow downwardly, and an auxiliary flap disposed to occupy a position in which it extends at least partially downwardly at the trailing edge of said wing from a position rearward of said slot, said flaps defining a cavity between them, and ducts extending from the exhausts of said power units to said slots whereby to project a gas stream outwardly and rearwardly from each said slot of sufficient energy to follow the contour of the associated auxiliary flap by virtue of the Coanda effect whereby to induce a trapped vortex in said cavity and to undergo further downward deflection and thus to impart a similar downward deflection of that part of said slipstream flowing along the upper surface of said wing.

4. An aircraft having a pair of wings and at least one power unit including a propulsive unit mounted forwardly of each wing in position to generate a gas stream to flow rearwardly over both the upper and under surfaces of said wing, each said wing comprising a slot disposed in the vicinity of its upper trailing edge rearwardly of said propulsive unit, a main flap movable into a position to extend downwardly into the path of that part of said gas stream flowing along the under surface of said wing to deflect such flow downwardly, and an auxiliary flap disposed to occupy a position in which it extends at least partially downwardly at the trailing edge of said wing from a position rearwardly of said slot, said flaps defining a cavity between them, and ducts extending from a said power unit to said slots to project a gas stream outwardly and rearwardly from each said slot of sufficient energy to follow the contour of the associated auxiliary flap by virtue of the Coanda effect whereby to induce a trapped vortex in said cavity and to undergo further downward deflection and thus to impart a similar downward deflection of that part of the first gas stream flowing along the upper surface of said wing.

References Cited in the file of this patent

UNITED STATES PATENTS

| | | |
|---|---|---|
| 2,137,879 | Ksoll | Nov. 22, 1938 |
| 2,761,634 | Velazquez | Sept. 4, 1956 |

FOREIGN PATENTS

| | | |
|---|---|---|
| 180,996 | Great Britain | Oct. 16, 1923 |